United States Patent [19]

Bowe et al.

[11] Patent Number: 4,943,007

[45] Date of Patent: Jul. 24, 1990

[54] SPRAY GENERATORS

[75] Inventors: Michael J. Bowe, New Longton; Stuart A. Clark, Hoghton, both of United Kingdom

[73] Assignee: United Kingdom Atomic Energy Authority, England

[21] Appl. No.: 319,253

[22] Filed: Mar. 3, 1989

[30] Foreign Application Priority Data

| | | | |
|---|---|---|---|
| Mar. 4, 1988 | [GB] | United Kingdom | 8805151 |
| May 25, 1988 | [GB] | United Kingdom | 8812394 |
| Dec. 2, 1988 | [GB] | United Kingdom | 8828332 |

[51] Int. Cl.[5] .......... B01D 53/18; B05B 1/10; B05B 12/00

[52] U.S. Cl. .......... 239/405; 239/589.1; 137/835; 55/238; 261/115

[58] Field of Search .......... 239/589.1, 405; 137/835, 836, 839; 55/238, 237; 261/115-117, 79.1, 79.2, DIG. 17; 422/123, 124

[56] References Cited

U.S. PATENT DOCUMENTS

| | | | |
|---|---|---|---|
| 3,343,341 | 9/1967 | Wiemer | 55/237 |
| 3,557,814 | 1/1971 | Neradka | 137/835 |
| 3,745,906 | 7/1973 | Kakei et al. | 137/835 |
| 4,008,056 | 2/1977 | Potter | 55/238 |
| 4,308,040 | 12/1981 | Rafson et al. | 239/589.1 |
| 4,375,976 | 3/1983 | Potter | 55/238 |

*Primary Examiner*—Andres Kashnikow
*Assistant Examiner*—Karen B. Merritt
*Attorney, Agent, or Firm*—King & Schickli

[57] ABSTRACT

A spray generator for producing a spray of liquid droplets of a narrow size spectrum in which a substantially uniform cyclic disturbance is imposed on fluid energing at a nozzle. Such a disturbance can be produced by a fluidic bistable oscillator or by allowing the fluid to flow across a bluff body in the flow path. An opposed jet arrangement can be located within the vortex chamber of a fluidic diode and the liquid spray produced can meet swirling gas introduced at tangential inlets to the chamber.

13 Claims, 8 Drawing Sheets

SPRAY GENERATORS

The present invention concerns spray generators.

BACKGROUND OF THE INVENTION

In a gas absorption process for example in which a liquid spray contacts a gas flow a nozzle arrangement can be selected to generate a spray of liquid droplets. However nozzle arrangements generate a wide spectrum of droplet sizes. Droplets which are significantly smaller than the required mean size can enhance interfacial area but will have an increased susceptibility to gas phase entrainment.

A reduction in droplet size spectrum can be produced by imposing a uniform cyclic disturbance on to a jet of liquid. This can be achieved by applying mechanical vibration or an ultrasonic source at the jet nozzle. The disturbance causes a regular dilational wave along the jet which ultimately breaks up the jet into near uniform droplets.

FEATURES AND ASPECTS OF THE INVENTION

According to the present invention a spray generator for producing a spray of droplets of narrow size spectrum comprises a pair of spaced-apart nozzles disposed such that fluid flows issuing therefrom impinge and interact to form a spray and fluidic means for imposing a substantially uniform cyclic disturbance on the fluid flows at the nozzles.

DESCRIPTION OF THE DRAWINGS

The invention will be described further, by way of example, with reference to the accompanying drawings; in which.

DESCRIPTION OF THE PREFERRED EMBODIMENTS

Figure 1:
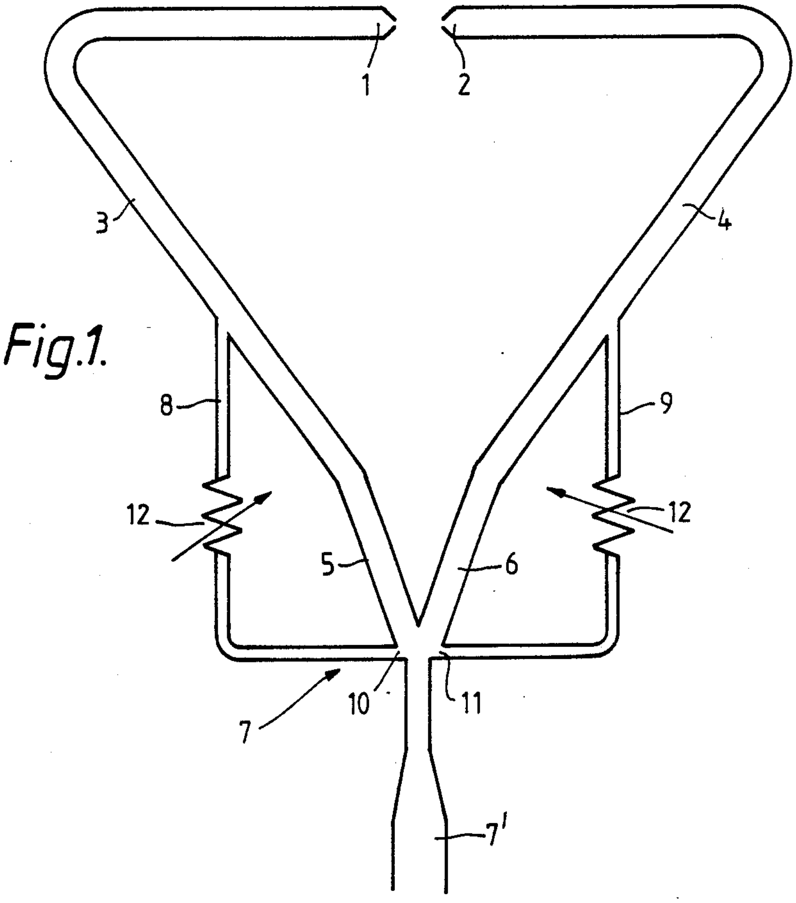
FIG. 1 is a diagrammatic representation of an embodiment having co-axial opposed nozzles.

In FIG. 1, a pair of spaced apart, co-axial nozzles 1, 2 are connected by conduits 3, 4 to output arms 5, 6 respectively of a bistable fluidic diverter 7. A liquid supply is connected to input 71 of the diverter. Feedback loops 8, 9 are connected between conduits 3, 4 respectively and the control ports 10, 11 of the diverter. Each feedback loop includes a variable fluidic resistance and capacitance 12. Alternatively, a variable capacitance located in the output arms can be sufficient to control the frequency of oscillation.

A spray of liquid is formed by the interaction of two streams emerging from the nozzles 1 and 2. Although the nozzles are shown in axial alignment in FIG. 1 it is possible to arrange the nozzles at other angles to produce a desired interaction of impinging fluid streams. The nozzles have equal flow areas which, conveniently, is of circular cross-section. When the jets of fluid emerging from the two nozzles have equal momentum flux, the resulting curtain of liquid will be normal to the axes of the nozzles. Such a curtain of liquid will disintegrate into droplets as instabilities develop and such droplets will vary in size due to the variable nature or random generation of the instabilities. To reduce the extent of the droplet size spectrum it is required to dominate the waveforms which result from the naturally occurring instabilities. This domination can be achieved by imposing a sinuous waveform on to the curtain of liquid.

Figure 2:
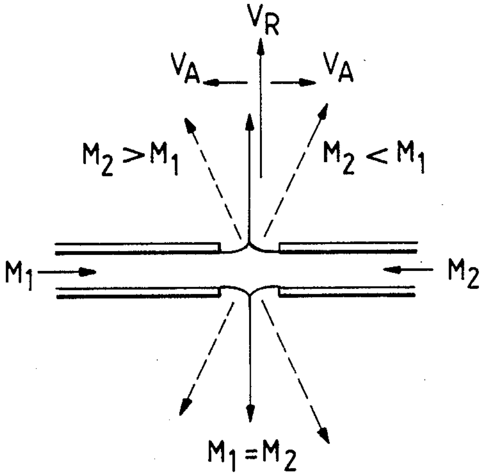
FIG. 2 is a schematic diagram.

In FIG. 2, $M_1$ and $M_2$ respectively denote the momentum flux at nozzles 1 and 2. $V_A$ and $V_R$ respectively are axial and radial components of velocity of liquid issuing from the nozzles.

Cyclic variations in $M_1$ and $M_2$ produce $V_A$ and $V_R$. The resultant is a liquid curtain with an imposed sinusoidal waveform.

Rapid cyclic variations in $M_1$ and $M_2$ can be produced by pressure fluctuations generated by the bistable fluidic diverter.

Flow emerging from input $7^1$ of the bistable diverter will attach itself to a wall of a flow channel at the exit from input $7^1$ to flow along either arm 5 or 6. If the flow is along arc 5 and conduit 3 to nozzle 1, an increase in pressure occurs in feedback loop 8 and this increase when applied to the port 10 causes the flow from input 71 to switch to the arm 6 and conduit 4. The same effect then takes place in feedback loop 9 to cause the flow to switch back to arm 5.

The wavelength of the sinusoidal waveform is a function of the radial velocity component $V_R$ and the frequency of switching of the pressure or momentum flux.

For sinusoidal waves the diameter of droplets produced by the break up of a wavefront is a function of the square root of a critical wavelength multiplied by a liquid sheet thickness parameter which is substantially dependent on liquid properties, such as viscosity, surface tension and density.

Consequently, variations in liquid properties can be compensated for by varying the radial velocity component and/or varying the frequency and amplitude of the resulting sinusoidal waveform. This can be done by adjusting the pressure downstream of the diverter and/or varying the frequency and amplitude of the momentum flux variation through changes in the fluidic diverter feedback loops 8 and 9. Variations in resistance and capacitance are the main parameters for changing the characteristics of the feedback loops.

As a result droplets of a required size spectrum can be produced regardless of reasonable variation in the quality of the feed liquid.

The apparatus can find use in burner nozzles to maintain combustion efficiency or emission levels regardless of changes in fuel oil viscosity and the like. In another application concerning spray dryer nozzles it is possible to obtain consistent narrow sized droplets regardless of variations in feed quality.

Figure 3:
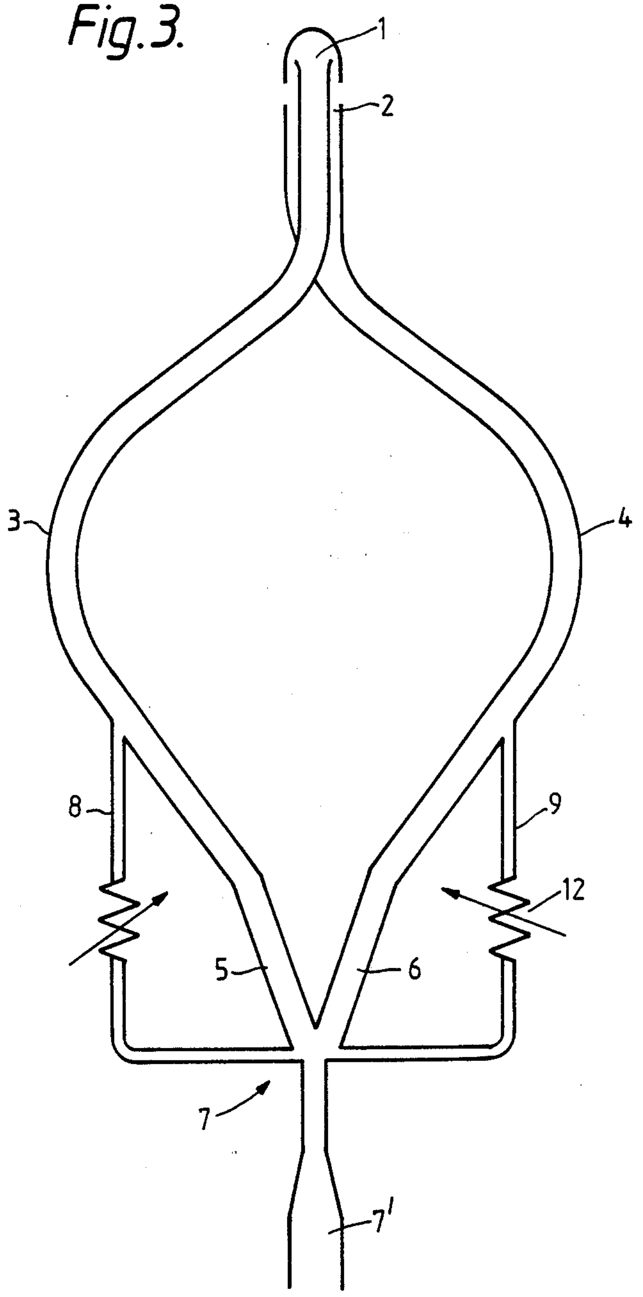
FIG. 3 is a diagram, similar to FIG. 1, of a second embodiment.

FIG. 3 shows an annular nozzle arrangement and the same reference numerals are used as in FIG. 1. Such an arrangement can be useful in burners having only a single chamber entry.

Figure 4:
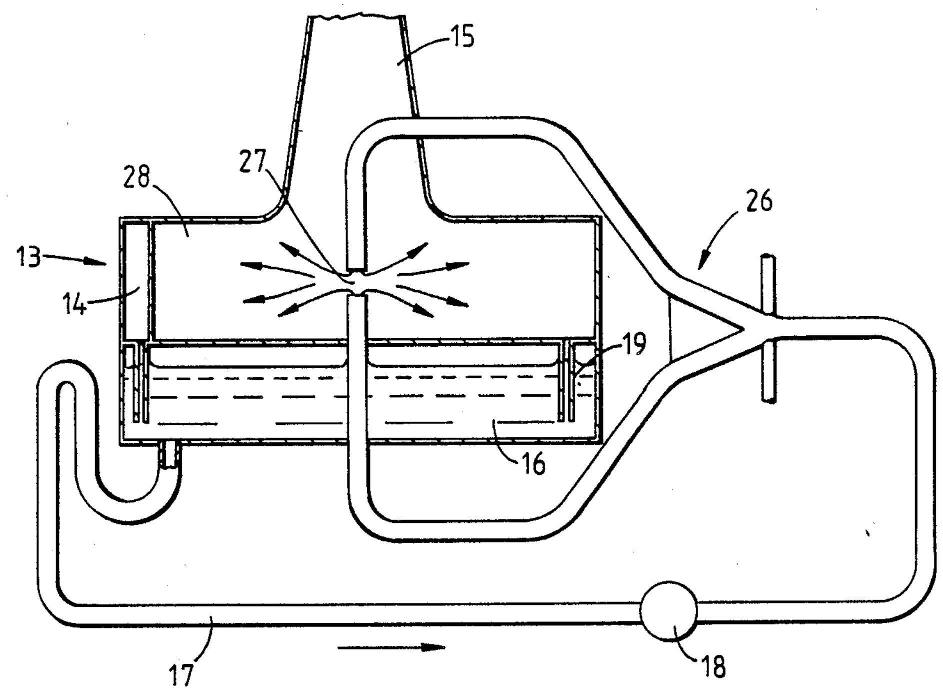
FIG. 4 is a schematic diagram of an embodiment used as a gas scrubber.

In FIG. 4, a bistable fluidic diverter or oscillator 26 has opposed jets 27 located within vortex chamber 28 of a fluidic diode 3. The diode is a device having a tangential inlet port 14 and an axial outlet 15 such that an incoming gas phase at the inlet port 14 spirals in the chamber 28 to emerge at the axial outlet 15.

A reservoir 16 for scrub liquid is conveniently located beneath the vortex chamber 28. The scrub liquid is pumped along pipe 17 to the bistable oscillator 26 by a pump 18. A substantially uniform radial spray curtain is produced within the vortex chamber 28 by liquid from the opposed jets 27. The liquid curtain has a wide cone angle, typically 45°. The opposed jets 27 can have large jets which can be well separated, for example by three times the jet diameter.

Droplets of liquid are produced by the oscillatory flow generated by the oscillator 26 at the region of jet impingement. As the arrangement does not rely on flow instabilities produced by constricting nozzles to produce droplets it is more suited for use with slurries and suspensions which could cause blockage of narrow nozzles.

Gas entering the vortex chamber 28 through the tangential inlet port 14 is washed by the spray curtain within the chamber. Drops are accelerated to the walls by the centrifugal forces imposed by the swirling gas stream. The apparatus functions by counter-current action. High velocities occur between the liquid and gas phases ensuring low gas phase resistance to mass transfer. Washed gas substantially disentrained of liquid by centrifugal separation emerges along axial outlet 15 and the spray liquid can be returned to the reservoir 16, for example by down pipes 19.

Figure 5:
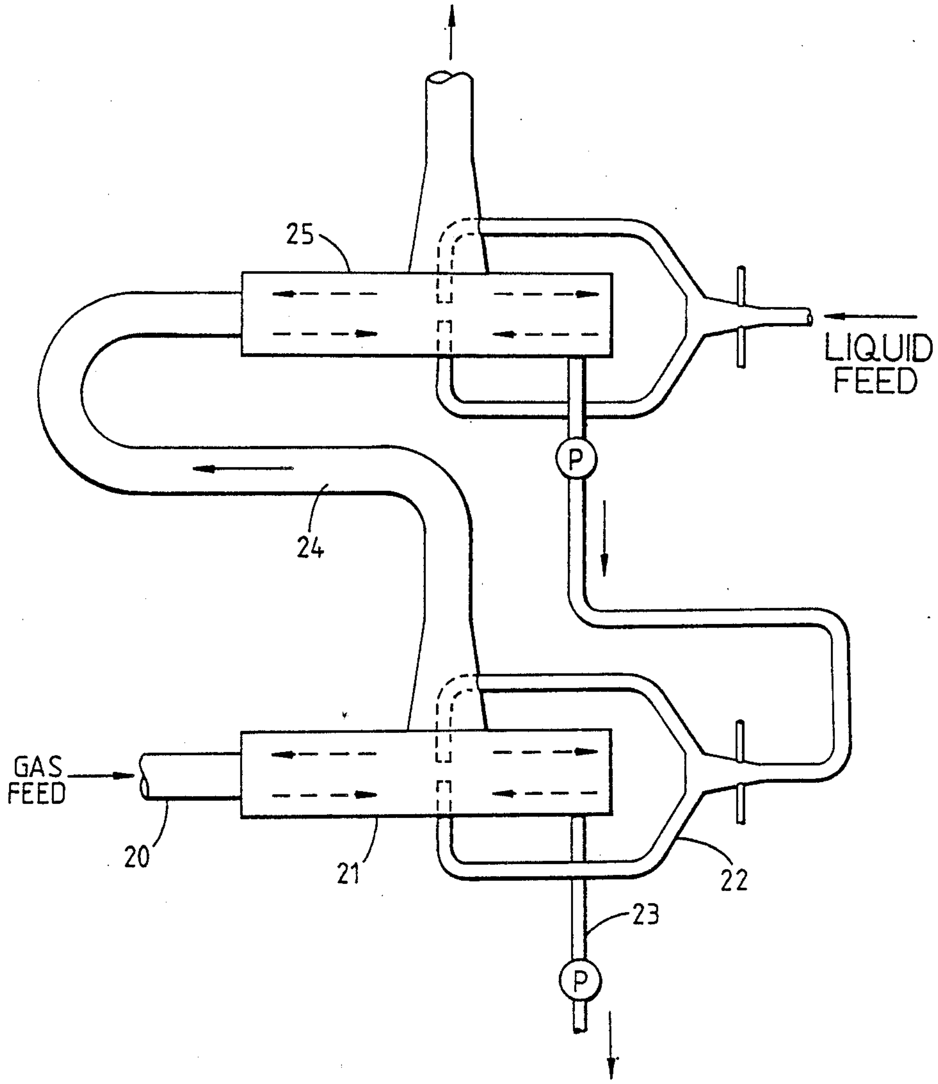
FIG. 5 is a schematic diagram of an embodiment used for distillation.

FIG. 5 shows a distillation apparatus comprising a cascade of individual units such as shown in FIG. 4. Gas flowing along pipe 20 enters the first vortex chamber 21 tangentially to meet a curtain liquid produced by the bistable oscillator 22. Liquid from the vortex chamber is pumped along pipe 23 to a boiler (not shown) and vapor or gas from the boiler flows along pipe 20. The gas emerging along pipe 24 from the chamber 21 constitutes the inlet gas phase into the second vortex chamber 25. Liquid from the second vortex chamber 25 is Pumped to the inlet of the oscillator 22 at the first unit of the cascade. Similarly additional stages can be added as required to produce a distillation apparatus.

Figure 6:
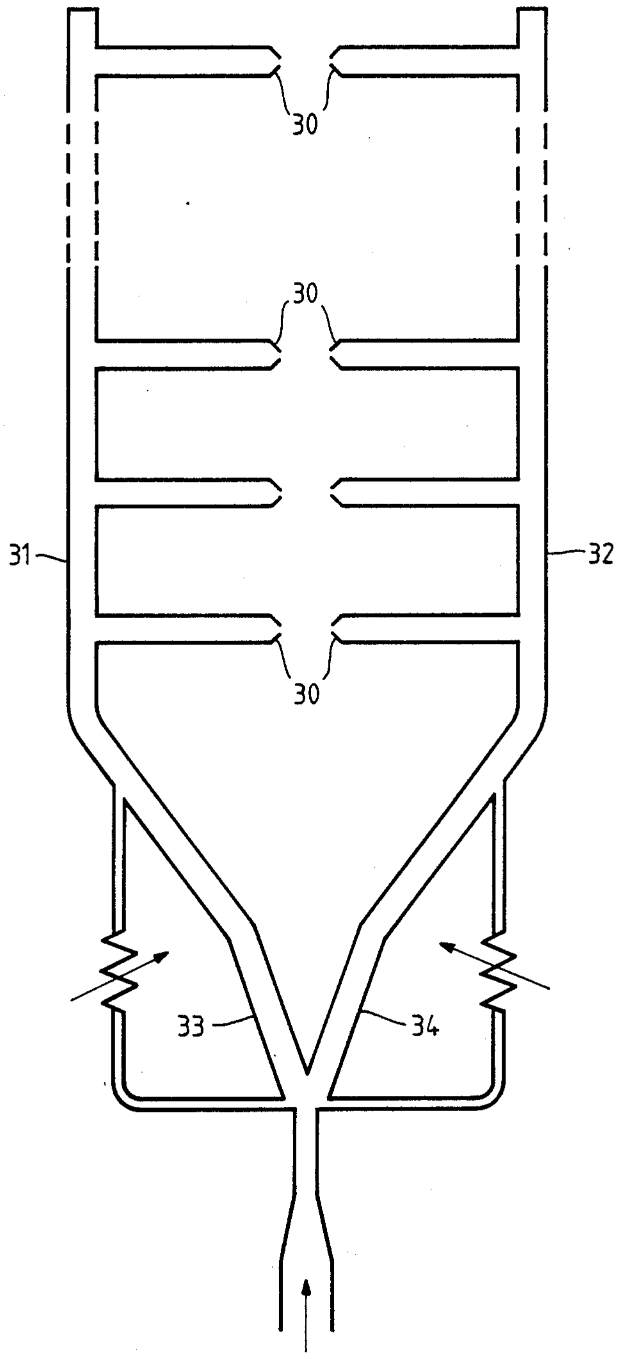
FIG. 6 is a diagram, similar to FIG. 1, having a plurality of pairs of opposed nozzles.

In FIG. 6, a plurality of pairs of spaced apart, substantially coaxial nozzles 30 are connected by conduits 31, 32 to the output arms 33, 34 of a fluidic diverter. The diverter is provided with feedback loops, each loop including a variable resistance and a variable capacitance in the manner shown in FIG. 1. The resistance can be provided by a restrictor in the feedback loop and the capacitance can be an enclosed volume in communication with the loop.

As before, a spray of liquid is formed by the interaction of two streams emerging from the nozzles 30 or from annular nozzles as in FIG. 3. The resulting curtain of liquid can find use as a safety curtain to combat fire. For example, the nozzles can be arranged across doors and bulkheads in aircraft cabins.

Figure 7:
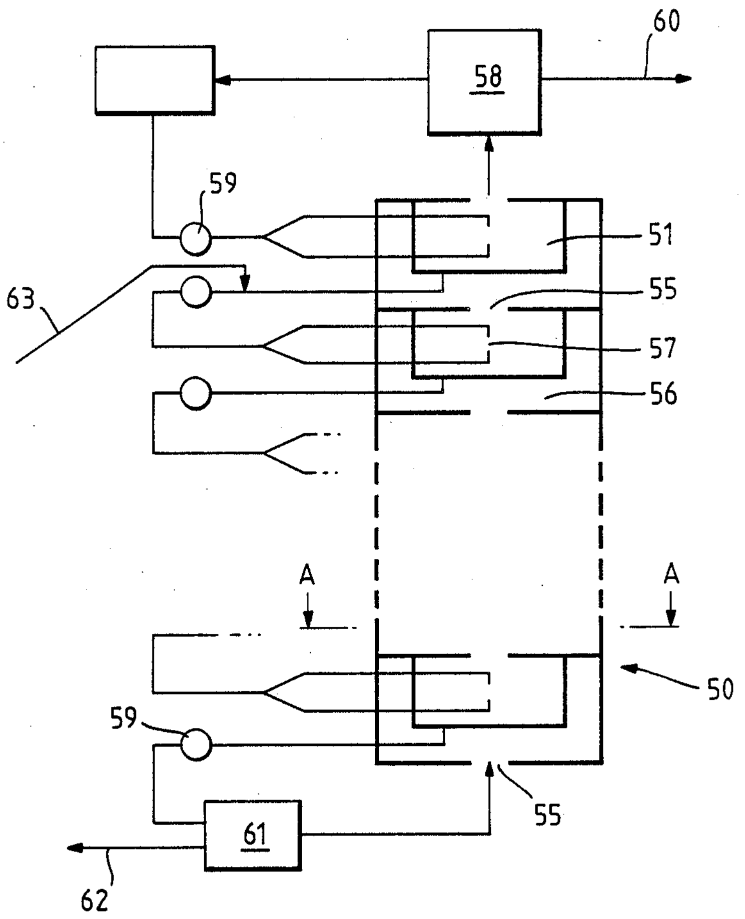
FIG. 7 represents diagrammatically a cascade arrangement.
Figure 8:
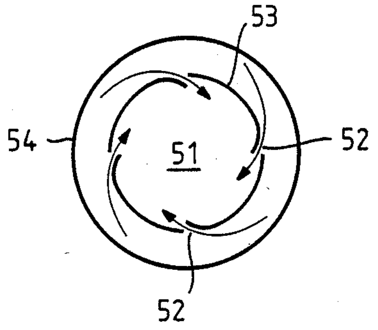
FIG. 8 is a section on A—A in FIG. 7.

FIGS. 7 and 8 illustrate a distillation apparatus comprising a plurality of individual units of the kind similar to that described with reference to FIG. 4. The units form a compact column.

Each unit 50 comprises a vortex chamber 51 having a plurality of openings 52 (FIG. 8) in side wall 53 for tangential gas flow. The vortex chamber 51 is enclosed within an outer chamber 54 having an opening 55 at the center of its base for the gas flow. The gas flows through a radial diffuser 56 to recover some static pressure drop in passing from the opening 55 to the openings 52. The swirling gas flow produced in the chamber 51 meets a liquid curtain produced by the opposed nozzles 57. Gas from the uppermost unit 50 in the column enters a condenser 58. Liquid from the condenser 58 is fed back to the column and pumped by pump 59 to the fluidic diverter and the opposed nozzles in the vortex chamber of the uppermost unit. Product from the condenser 58 is drawn off along line 60. Similarly, from the bottom unit of the column liquid is pumped to a boiler 61 and vapor or gas from the boiler is introduced into the bottom of the column. A product stream from the boiler flows along line 62. A feed can be introduced at line 63.

Figure 9:
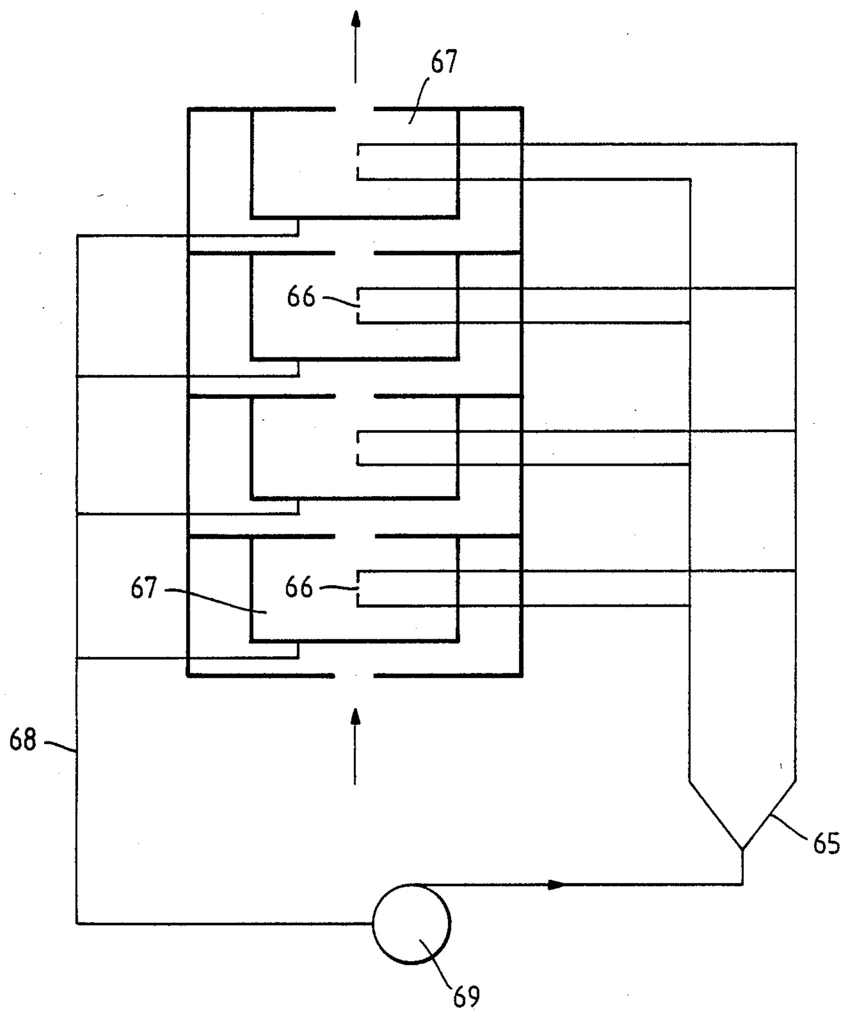
FIG. 9 is a schematic diagram of a further embodiment.

In an alternative arrangement seen in FIG. 9 a single fluidic diverter 65 communicates with a plurality of pairs of opposed nozzles 66. Each pair of nozzles 66 is located within a respective vortex chamber 67. Gas passes upwardly through the column and liquid is returned to the fluidic diverter 65 along line 68 containing Pump 69.

Figure 10:
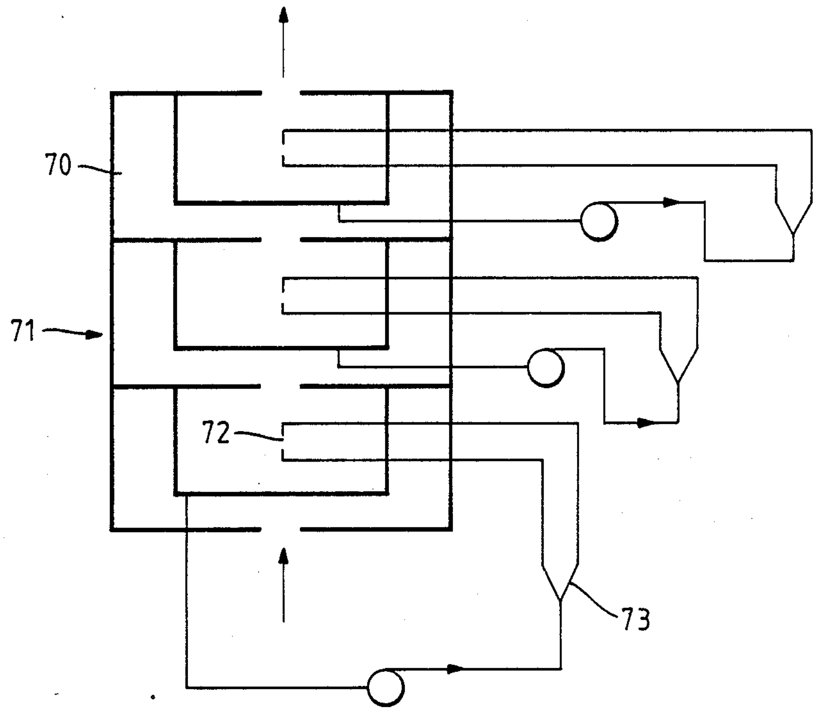
FIG. 10 is a schematic diagram of a yet further embodiment.

In FIG. 10 a plurality of individual units 70 each comprising a pair of nozzles 72 located within a vortex chamber of a fluidic diode and as described with reference to FIG. 4 are stacked together into a column. The nozzle pairs each communicate with an associated fluidic diverter 73.

A gas supply to be treated is introduced into the bottom unit of the column 71 to pass upwardly through the liquid sprays generated in each unit by the impinging flows emerging at nozzles 72. In this arrangement a different liquid can be applied at each unit and furthermore different spray droplet sizes can be created in each unit. The units can be adjusted independently.

Figure 11:
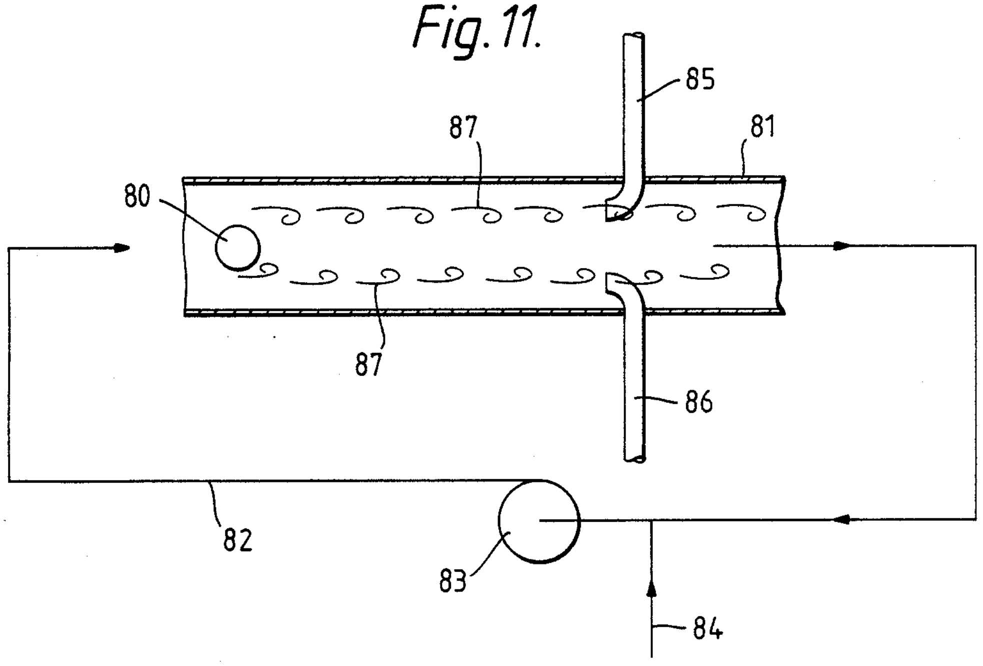
FIG. 11 is a schematic diagram of still yet a further embodiment.

The embodiment in FIG. 11 comprising a vortex shredder is capable of functioning at higher frequencies and at lower amplitudes. A bluff body 80 such as a cylinder is located across the travel flow of a liquid along a conduit 81. Liquid is pumped around closed path 82 by pump 83, the liquid supply being introduced at 84. Pitot tubes 85, 86 extend into the flow path along conduit 81. In passing over the bluff body the liquid flow forms vortices 87 in antiphase and the pitot tubes are connected to nozzles to produce spray of droplets.

We claim:

1. A spray generator for producing a spray of droplets of narrow size spectrum comprising a pair of spaced-apart nozzles disposed such that liquid flows issuing therefrom impinge and interact to form a spray, and means for imposing a substantially uniform cyclic disturbance on the liquid flows at the nozzles, which nozzles are located in a vortex chamber, the vortex chamber having a tangential gas inlet and an axial gas outlet, the nozzles being located in a central region as viewed axially.

2. Apparatus according to claim 1 in which the said means comprises a bistable fluidic diverter having output arms connected to the respective nozzles and an adjustable feedback loop connecting each output arm to an associated control port of the fluidic diverter.

3. Apparatus according to claim 2 in which each feedback loop includes a variable fluidic resistance and capacitance.

4. Apparatus according to claim 2 in which the nozzles are co-axial.

5. Apparatus according to claim 4 in which the nozzles are of annular section.

6. Apparatus according to claim 4 in which the nozzles are of equal flow areas.

7. Apparatus according to claim 1 having a plurality of vortex chambers formed into a column, each vortex chamber containing a pair of nozzles.

8. Apparatus according to claim 7 in which the pair of nozzles in each chamber communicate with a common fluidic diverter.

9. Apparatus according to claim 7 in which the pair of nozzles in each chamber communicate with an respective fluidic diverter.

10. A spray generator as claimed in claim 1, in which the inlet has an axial extent, and the nozzles are located axially within said axial extent.

11. A spray generator as claimed in claim 1, in which the axial outlet is formed by an axial end wall of the chamber.

12. A spray generator as claimed in claim 1, including a radial diffuser through which the gas flows before the inlet.

13. A spray generator comprising a vortex chamber having a tangential gas inlet and an axial gas outlet, two spaced-apart nozzles disposed such that liquid flows through the nozzles impinge and interact to form a spray, the flows being transverse to a radial plane, the nozzles being located in a central region as viewed axially.

* * * * *